United States Patent
Loh et al.

(10) Patent No.: US 12,249,243 B2
(45) Date of Patent: Mar. 11, 2025

(54) ANOMALY DETERMINATION IN GEOSPATIAL DATA

(71) Applicant: The Boeing Company, Chicago, IL (US)

(72) Inventors: Rowena Loh, Singapore (SG); Andrea Sanzone, Frankfurt (DE); Rahul Ashok, Singapore (SG)

(73) Assignee: The Boeing Company, Arlington, VA (US)

( * ) Notice: Subject to any disclaimer, the term of this patent is extended or adjusted under 35 U.S.C. 154(b) by 20 days.

(21) Appl. No.: 17/653,822

(22) Filed: Mar. 7, 2022

(65) Prior Publication Data

US 2023/0282117 A1    Sep. 7, 2023

(51) Int. Cl.
*G08G 5/00* (2006.01)
*G01C 21/00* (2006.01)

(52) U.S. Cl.
CPC ............ *G08G 5/003* (2013.01); *G01C 21/387* (2020.08); *G01C 21/3893* (2020.08); *G08G 5/0043* (2013.01); *G08G 5/0082* (2013.01)

(58) Field of Classification Search
CPC .... G08G 5/003; G08G 5/0043; G08G 5/0082; G01C 21/387; G01C 21/3893
See application file for complete search history.

(56) References Cited

U.S. PATENT DOCUMENTS

| | | | | |
|---|---|---|---|---|
| 2007/0021908 | A1* | 1/2007 | Jaugilas | G09B 29/005 701/450 |
| 2020/0168104 | A1* | 5/2020 | Holder | G08G 5/0039 |
| 2020/0372624 | A1* | 11/2020 | Braun | G06T 7/11 |
| 2023/0136572 | A1* | 5/2023 | Songa | G08G 5/065 701/2 |

OTHER PUBLICATIONS

"Jeppesen Airport Moving Maps," Jeppesen: A Boeing Company, Available Online at https://ww2.jeppesen.com/wp-content/uploads/2019/02/airport-moving-maps-fact-sheet.pdf, Available as Early as Jan. 25, 2021, 2 pages.

\* cited by examiner

*Primary Examiner* — Peter D Nolan
*Assistant Examiner* — Roy Rhee
(74) *Attorney, Agent, or Firm* — Alleman Hall & Tuttle LLP

(57) ABSTRACT

A computing device is provided comprising a processor and a memory storing instructions executable by the processor. The instructions are executable by the processor to monitor location information for a plurality of aircraft in a geographic region. Geospatial data is received for the geographic region. The geospatial data comprises, for each of one or more physical objects in the geographic region, a virtual representation of the physical object. The instructions are further executable to determine that the location information meets a threshold difference compared to expected location information for a selected virtual representation of a physical object. An indication of an anomaly is output based at least on the determination that the location information meets the threshold difference.

20 Claims, 11 Drawing Sheets

ANOMALY DETERMINATION IN GEOSPATIAL DATA

BACKGROUND

Geographic information systems, such as airport mapping databases (AMDBs) describe a spatial layout of a geographic region and one or more physical objects in the geographic region. For example, geospatial data for an airport in an AMDB can include a virtual representation for each of one or more physical objects at the airport, such as a runway, a taxiway, a parking area, a gate, and/or a deicing area.

SUMMARY

According to one aspect of the present disclosure, a computing device comprises a processor and a memory storing instructions executable by the processor. The instructions are executable by the processor to monitor location information for a plurality of aircraft in a geographic region. Geospatial data is received for the geographic region. The geospatial data comprises, for each of one or more physical objects in the geographic region, a virtual representation of the physical object. The instructions are further executable to determine that the location information meets a threshold difference compared to expected location information for a selected virtual representation of a physical object. An indication of an anomaly is output based at least on the determination that the location information meets the threshold difference.

This simplified summary of the specification is presented to provide a basic understanding of some aspects of the specification. This summary is not an extensive overview of the specification. It is intended to neither identify key or critical elements of the specification nor delineate any particular embodiments of the specification, or any scope of the claims. Its sole purpose is to present some concepts of the specification in a simplified form as a prelude to the more detailed description that is presented in this disclosure.

The features, functions, and advantages that have been discussed can be achieved independently in various embodiments or can be combined in yet other embodiments, further details of which can be seen with reference to the following description and drawings.

DETAILED DESCRIPTION

Geographic information system (GIS) databases describe a spatial layout of a geographic region and one or more physical objects in the geographic region. For example, an airport mapping database (AMDB) describes the spatial layout of an airport and can include a virtual representation for each of one or more physical objects at the airport, such as a runway, a taxiway, a parking area, a gate, and/or a deicing area. However, in some instances, a physical object does not have a corresponding virtual representation in the database. In other examples, one or more virtual representations may be defined incorrectly.

AMDBs and other GIS databases can be reviewed by a human analyst to correct or update virtual representations of objects contained therein. For example, an analyst can visually compare an AMDB map of an airport with satellite images to identify anomalies in the map. However, this process can be time consuming, and human analysts are prone to missing information. In addition, the satellite images used for comparison can be outdated, distorted, or otherwise inaccurate. As such, human analysts often attempt to contact one or more authorities at an airport prior to making changes to the AMDB, sometimes unsuccessfully. Thus, the process of ensuring accuracy in airport mapping can be lengthy and inefficient.

To address the above issues, examples are disclosed that relate to detecting an anomaly in aviation object data. Briefly, location information is monitored for a plurality of aircraft in a geographic region. Geospatial data is received for the geographic region. The geospatial data comprises, for each of one or more physical objects in the geographic region, a virtual representation of the physical object. An indication of an anomaly is output upon determining that the location information meets a threshold difference compared to expected location information for a selected virtual representation of a physical object. In this manner, the location information is used to identify any anomalies in the geospatial data, ensuring that users receive accurate and up-to-date information.

Using the location information to detect anomalies can reduce the time and effort involved in manually confirming the accuracy of geospatial data. For example, a potential misalignment between a virtual representation and a physical object can be confirmed or dismissed based upon the location information, avoiding potentially lengthy delays involved in contacting airport authorities for clarification. Additionally, in some instances, the location information is more accurate than satellite imagery. Furthermore, anomaly detection can be performed continuously or at scheduled times, serving as an ongoing check on the geospatial data even if no anomalies are detected, and identifying changes at airports in advance of official notification.

Figure 1:
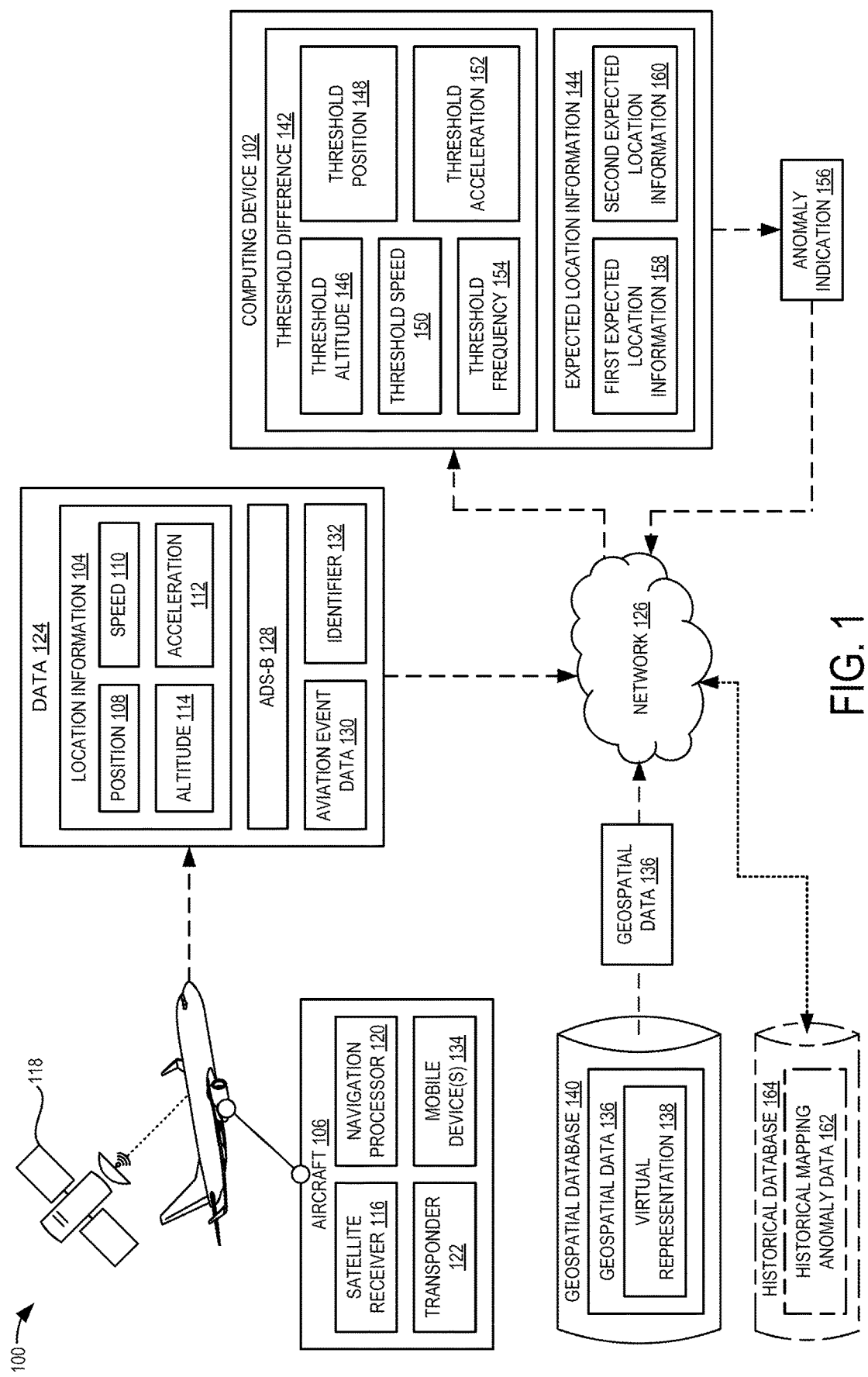
FIG. 1 shows an example of a system for detecting an anomaly in aviation object data.

FIG. 1 shows one example of a system 100 for detecting an anomaly in aviation object data. The system 100 comprises a computing device 102. The computing device 102 comprises a processor and a memory storing instructions executable by the processor. The instructions are executable to implement the methods and processes described herein.

In some examples, the computing device 102 comprises a desktop computing device or a server computing device located at a ground station (e.g., a datacenter). In other examples, the computing device 102 comprises any other suitable type of computing device. Some examples of suitable computing devices include a laptop computing device or a mobile computing device. Additional aspects of the computing device 102 are described in more detail below with reference to FIG. 11.

The computing device 102 is configured to monitor location information 104 for a plurality of aircraft 106 in a geographic region. In some examples, the location information 104 comprises, for each aircraft 106 of the plurality of aircraft, a position 108 of the aircraft 106, a speed 110 of the aircraft, an acceleration 112 of the aircraft, an altitude 114 of the aircraft, and/or any combination thereof.

For example, the aircraft 106 comprises a satellite receiver 116 that is communicatively coupled with a global navigation satellite system (GNSS) 118 that transmits positioning, navigation, and timing (PNT) data. A navigation processor 120 of the aircraft 106 determines the aircraft location information 104 based on the PNT data and sends the location data 104 to transponder 122. The transponder 122 is configured to broadcast data 124 including the location information 104. In some examples, the data 124 is broadcast on a continuous or a periodic basis, such as via a mode S extended squitter message. In this manner, the location information 104 is made available to the computing device 102.

The computing device 102 is configured to obtain the location information 104 via a network 126. In some examples, the network 126 comprises a wireless communication link between the computing device 102 and the aircraft 106. For example, the computing device 102 and/or another device located within the network 126 may include a 1090 MHz antenna configured to receive a mode S signal from the aircraft 106 that includes the location information 104. Additional aspects of the network 126 and communication components of the computing device 102 are described in more detail below with reference to FIG. 11.

In some examples, the data 124 received from the aircraft 106 comprises automatic dependent surveillance-broadcast (ADS-B) signals 128, and the computing device 102 is configured to obtain the location information 104 for the plurality of aircraft from the ADS-B signals 128. As described in more detail below, the data 124 optionally includes other information pertaining to the aircraft 106, such as aviation event data 130 (e.g., a message indicating aircraft takeoff or landing) and an identifier 132 (e.g., a flight number, aircraft model, registration number, or call sign) of the aircraft 106, which can be derived from the ADS-B signals 128.

It will also be appreciated that the computing device 102 may additionally or alternatively receive any other suitable input data. Some other examples of suitable input data include, but are not limited to, radar signals, signals received from one or more mobile devices 134, and signals received from a multilateration system. For example, the computing device 102 may additionally or alternatively receive the location information 124 from one or more mobile devices 134 (e.g., a tablet computing device or a smartphone) present in the aircraft 106. In this manner, the location information received from the mobile devices 134 can be used in place of location information received from other sources (e.g., ADS-B signals or a multilateration system), allowing the computing device 102 to monitor aircraft behavior when other sources of location information are not available. In other examples, the location information received from the mobile devices 134 can be used to augment location information received from other sources, potentially making the location information more accurate.

Figure 2:
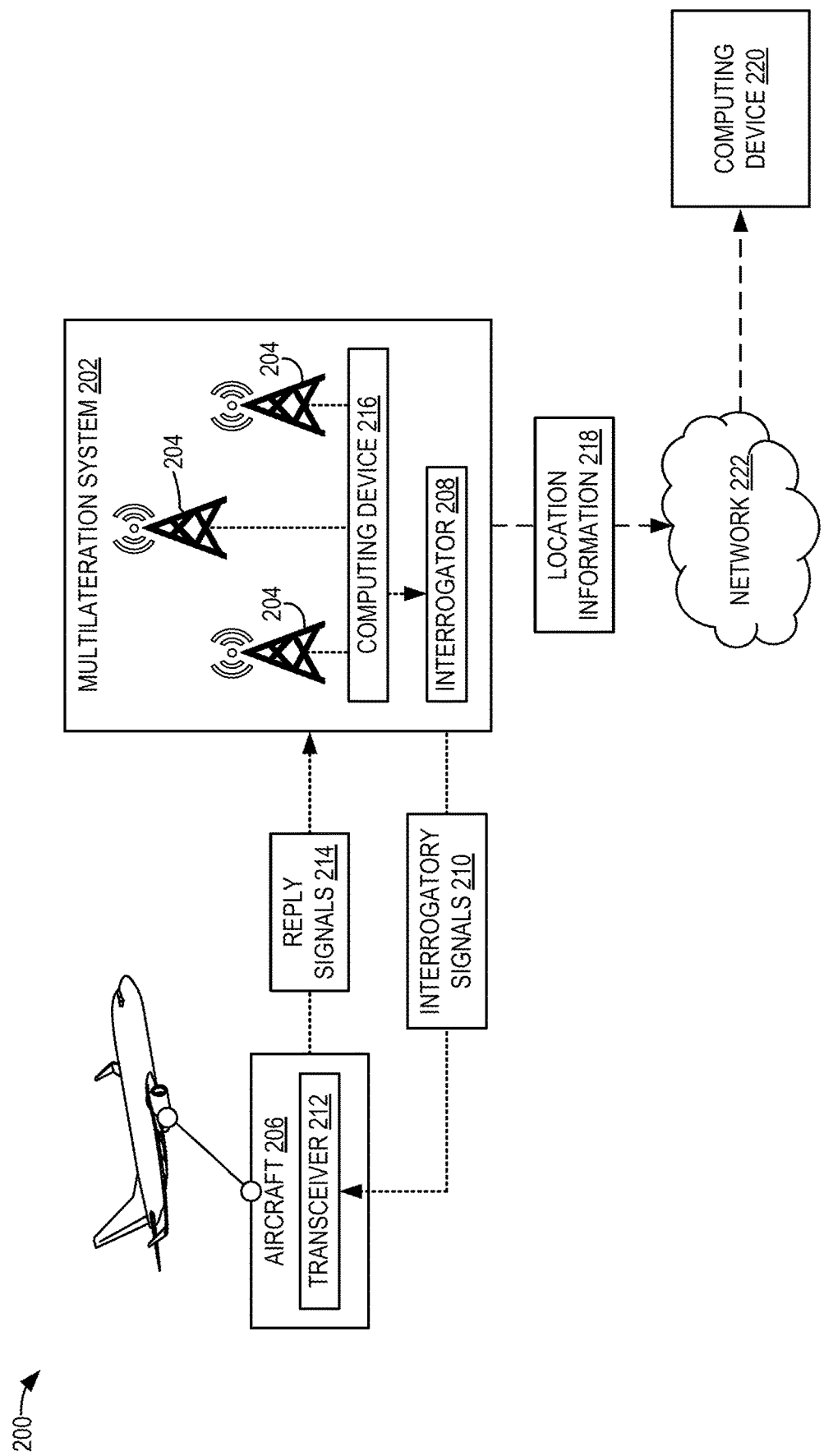
FIG. 2 shows another example of a system for detecting an anomaly in aviation object data, in which location information is received using a multilateration system.

FIG. 2 shows another example of a system 200 for monitoring location information of a plurality of aircraft using a multilateration system 202 for. The multilateration system 202 comprises three or more antennas 204. Each of the three or more antennas 204 is positioned at a different location, such that a signal is received from an aircraft 206 reaches each of the three or more antennas 204 at a different time based upon the location of the aircraft 206. As described below, this difference in time can be used to determine the location of the aircraft.

An interrogator 208 transmits interrogatory signals 210 configured to induce an aircraft transceiver 212 to transmit reply signals 214. The reply signals 214 are received by the antennas 204, and a multilateration computing device 216 calculates location information 218 based upon the time difference of arrival (TDOA) between each of the antennas 204.

In some examples, the location information 218 serves as the location information 104 of FIG. 1. In this manner, the location information can be obtained in examples where the aircraft is equipped with multilateration equipment, and ADS-B or satellite navigation signals are not received at a ground station. In other examples, the location data 218 is used to augment location information (e.g., the location information 104) determined using other means. In this manner, the multilateration system can increase the accuracy of the location information.

The location information 218 is transmitted to a computing device 220, e.g. via network 222. In some examples, the computing device 220 can serve as the computing device 102 of FIG. 1 and the network 222 can serve as the network 126 of FIG. 1. In this manner, the computing device obtains the location information for the aircraft.

With reference again to FIG. 1, the computing device 102 is further configured to receive geospatial data 136 for the geographic region. In some examples, the geospatial data 136 is received from a geospatial database 140 maintained at the computing device 102. In other examples, the geospatial database 140 is located at another computing device, such as a remote server. Advantageously, by utilizing a remote server to host and maintain the geospatial database 140, these tasks are offloaded from the computing device 102.

Figure 3:
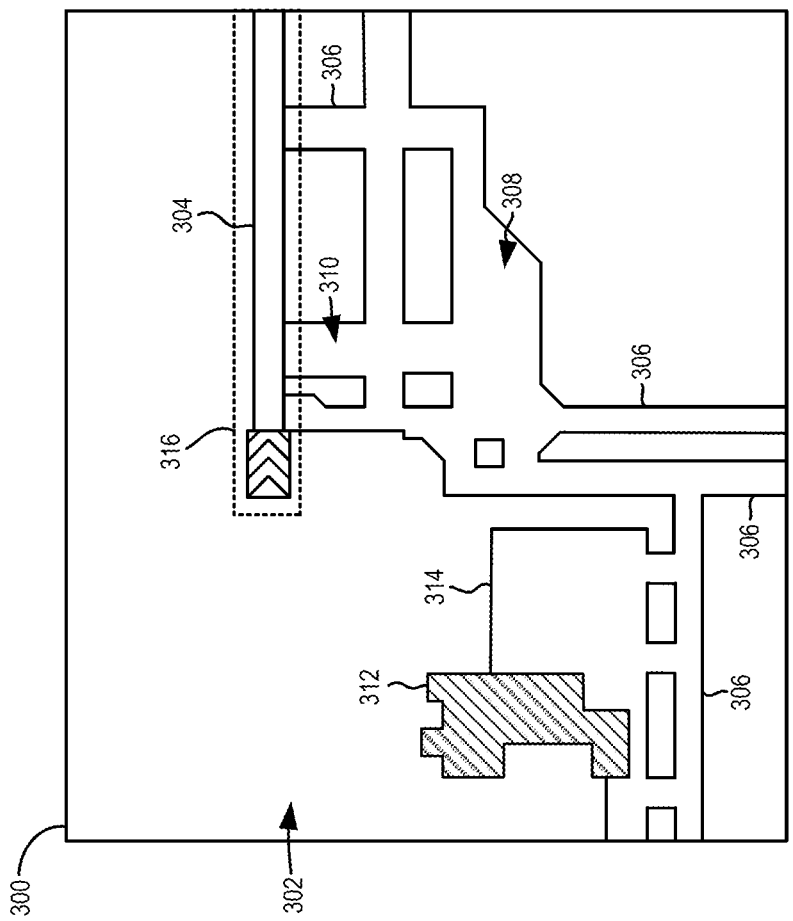
FIG. 3 shows an example of geospatial data that can be used in the system of FIG. 1.

The geospatial data 136 comprises, for each of one or more physical objects in the geographic region, a virtual representation 138 of the physical object. In some examples, the one or more physical objects include one or more of a runway, a taxiway, a parking stand, a deicing pad, a ramp, or an apron. FIG. 3 shows an example of geospatial data in the form of a map 300 of an airport 302. The map 300 includes a runway 304 and a plurality of taxiways 306. The map 300 also includes a parking area/parking stand 308, a deicing area/deicing pad 310, a ramp 312 (e.g., a passenger or cargo terminal), and an apron 314 (e.g., a preflight or maintenance area).

The map 300 also includes a virtual representation of the runway 304 in the form of a polygon 316. In other examples, the virtual representation has any other suitable shape. Some other examples of suitable shapes include three-dimensional generalized polygons (e.g., polyhedrons), conic sections, spheres, and ellipsoids. In this manner, the shape of the virtual representation may conform to the shape of the physical object.

With reference again to FIG. 1, the computing device 102 is configured to determine whether the location information 104 meets a threshold difference 142 compared to expected location information 144 for a selected virtual representation 138 of a physical object. In some examples, and as described in more detail below with reference to FIGS. 4-9, the location information 104 is compared to such information as a threshold altitude 146, a threshold position 148, a threshold speed 150, a threshold acceleration 152, a threshold frequency 154 at which one or more aircraft are located at a selected virtual representation, combinations thereof, and/or any other suitable thresholds. Using such thresholds allows anomalies (e.g., misalignment of the virtual representation with its corresponding physical object) to be identified in the geospatial data.

Further, in some examples, the expected location information 144 comprises first expected location information 158 for a first aircraft type and second expected location information 160 for a second aircraft type. For example, the first expected location information 158 may include a higher expected speed for a larger aircraft than an expected speed in the second expected location information 160 of a smaller aircraft. Accordingly, the thresholds used to detect an anomaly accurately reflect the performance of different aircraft types.

Based at least on the determination that the location information 104 meets the threshold difference 142, the computing device 102 is configured to output an indication 156 of an anomaly. The indication 156 may comprise one or more of any suitable type of indicator. Some examples of suitable indicator types include, but are not limited to, graphic, haptic, and audio outputs.

In some examples, the indication 156 is output to a local memory or processor on the computing device 102. In this manner, the indication can be stored and/or subjected to additional downstream processing. In other examples, the indication 156 is output to another device, such as a workstation computing device. For example, the indication 156 can be output to another device for display to a human analyst. In this manner, the human analyst can be notified that a potential anomaly was detected, and can proceed to evaluate and/or correct the potential anomaly.

Figure 4:
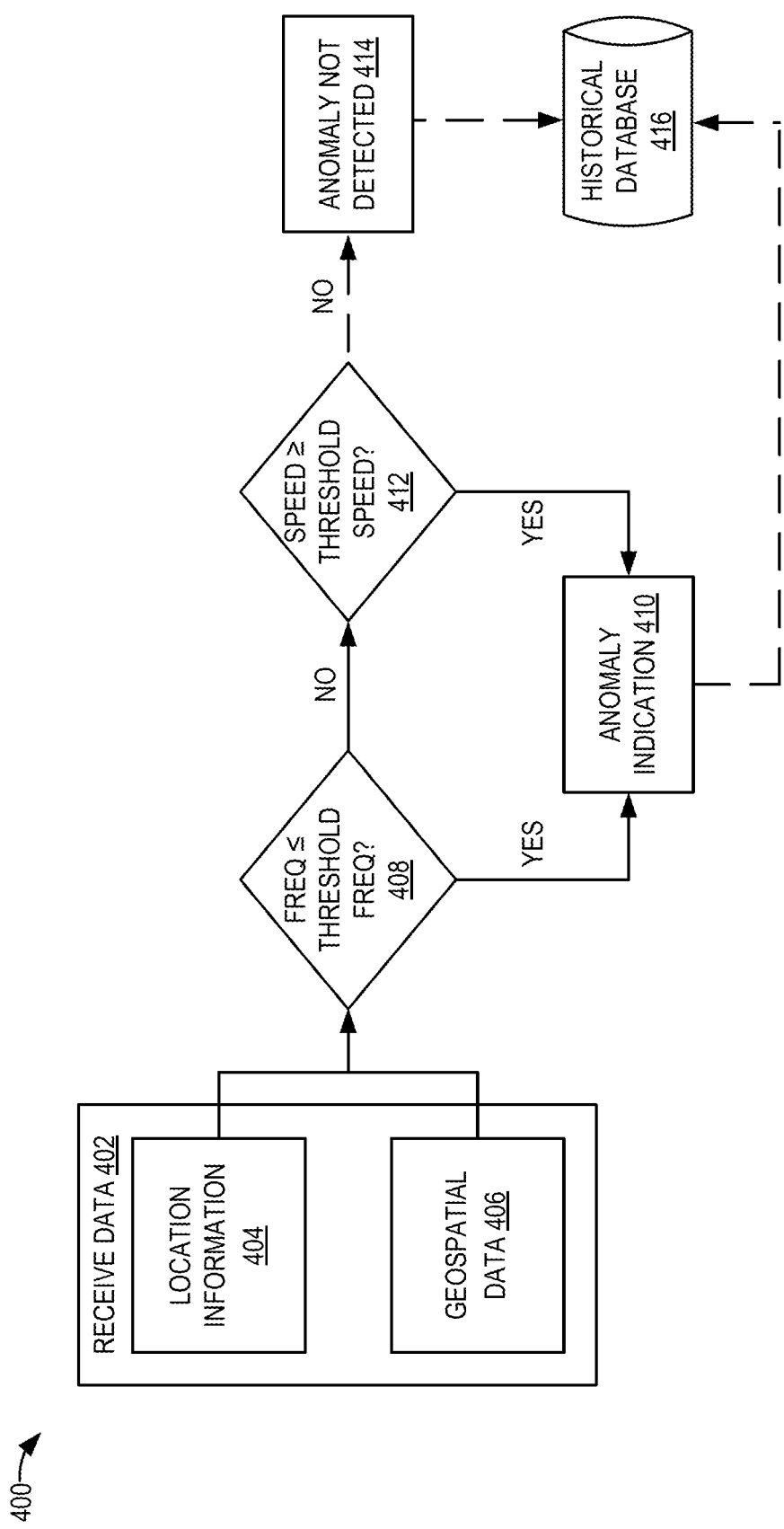
FIG. 4 shows a flowchart of an example method for detecting an anomaly in aviation object data.

FIG. 4 shows a flowchart of an example method 400 for detecting an anomaly in aviation object data. The following description of method 400 is provided with reference to the components described herein and shown in FIGS. 1-3 and 5-11. In some examples, the method 400 is performed at the computing device 102 of FIG. 1 or the computing device 220 of FIG. 2. In other examples, the method 400 is performed in other contexts using other suitable components.

At 402, the method 400 comprises receiving data. The data received at 402 includes location information 404 (e.g., the location information 104 of FIG. 1 or the location information 218 of FIG. 2) for a plurality of aircraft in a geographic region and geospatial data 406 (e.g., the geospatial data 136 of FIG. 1) for the geographic region. As described above, the geospatial data comprises, for each of one or more physical objects in the geographic region, a virtual representation of the physical object.

As introduced above, the geospatial data 406 is evaluated by comparing the location information 404 to expected location information for a selected virtual representation of a physical object. This comparison is executed at step 408 by determining if a frequency at which aircraft of the plurality of aircraft are located at the virtual representation of the physical object is less than or equal to a threshold frequency.

If the frequency is less than or equal to the threshold frequency, the method 400 includes outputting an indication of an anomaly at 410. In some examples, the indication of the anomaly generated at 410 serves as the one or more anomaly indicators 156 of FIG. 1.

Figure 5:
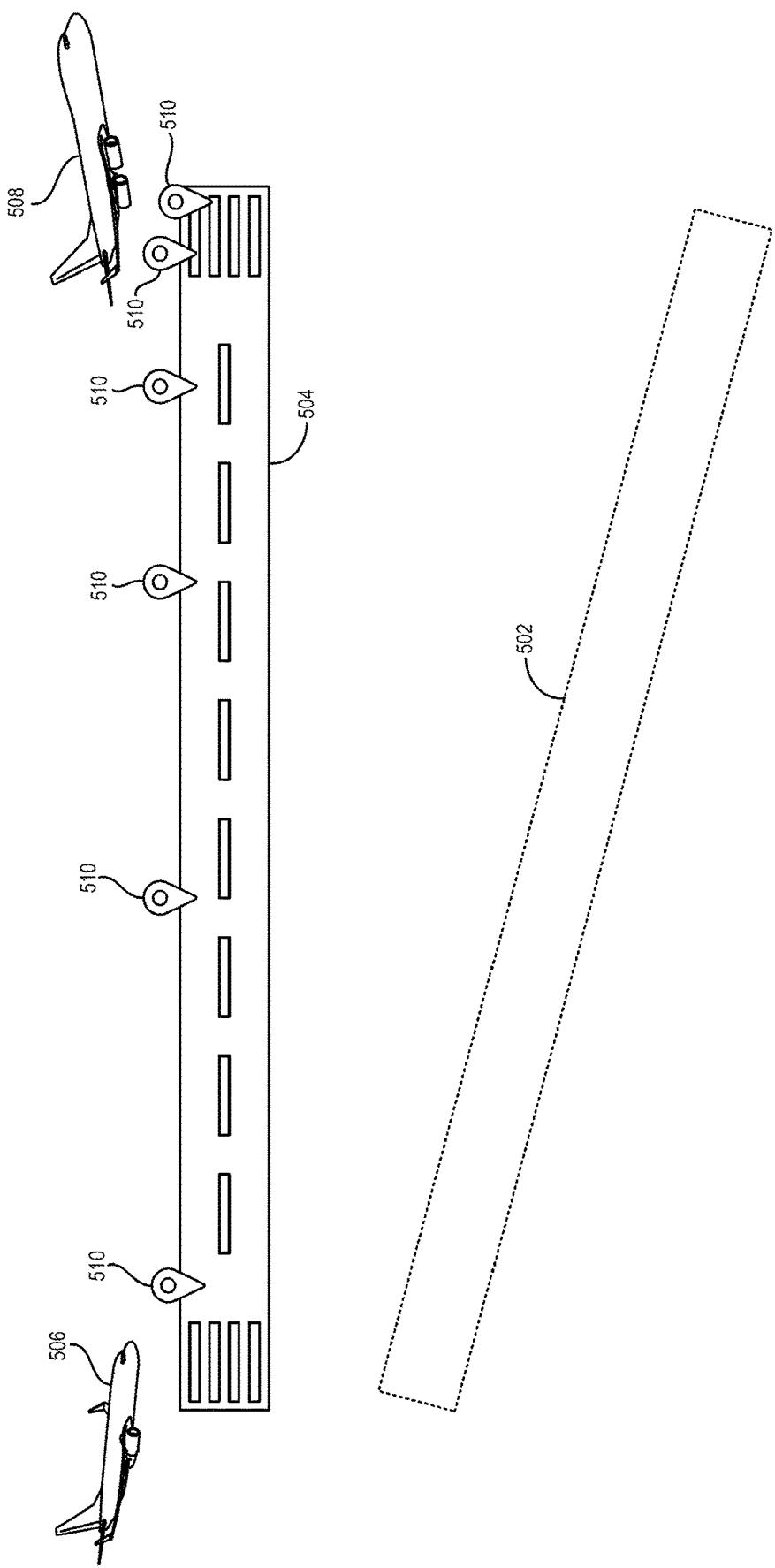
FIG. 5 shows an example use-case scenario including a virtual representation of a physical runway utilized by a plurality of aircraft.

FIG. 5 shows an example use-case scenario including a virtual representation 502 of a physical runway 504 utilized by a plurality of aircraft 506, 508. Location information for the plurality of aircraft 506, 508 comprises a plurality of position points 510. The position points 510 are used to identify a frequency at which the aircraft 506, 508 are located at the virtual representation 502 of the runway 504 over a period of time.

In the example of FIG. 5, the virtual representation 502 is not aligned to the physical runway 504. The misalignment of the virtual representation 502 can be detected by the method 400 of FIG. 4. For example, a threshold frequency associated with the virtual representation 502 of the runway 504 indicates a number of position points 510 (e.g., 6) expected to register within virtual representation 502 as a result of the aircraft 506, 508 using the runway 504 within a time (e.g., 10 minutes). However, because the virtual representation 502 is misaligned with the runway 504, none of the position points 510 fall within the virtual representation 502. Thus, the threshold frequency is not met at step 408 of FIG. 4, triggering the output of the anomaly indication 410. In this manner, the misalignment between the virtual representation and the physical runway is detected using the position points of the aircraft.

In some examples, the threshold is a static threshold or a dynamic threshold. For example, a dynamic threshold frequency may be lower for a runway of a passenger airport at night than during the day, while a static threshold frequency may be the same at all hours of the day. In this manner, the use of a dynamic threshold allows the anomaly detection process to adapt to current airport conditions. However, in other examples, a static threshold can be used.

It will also be appreciated that, in some examples, the threshold is different at different airports. For example, a runway at a busy airport (e.g., Hartsfield-Jackson Atlanta International Airport (KATL)) may have a higher threshold frequency (e.g., 200 aircraft/hour) than a runway at a smaller airport (e.g., 15 aircraft/hour at Pearson Field (KVUO)). In this manner, the threshold accurately reflects airport usage.

In some examples the threshold is set manually, providing users with a high level of control over expected aircraft behavior. In other examples, the threshold is determined programmatically. For example, a threshold can be established by adapting expected aircraft behavior associated with a similar physical object. For example, a threshold frequency for a runway at KATL may be used as an initial threshold frequency for a runway at Denver International Airport (KDEN). The initial threshold frequency can then be adjusted for local airport conditions, such as traffic volume, aircraft types, and local restrictions. For example, there may be a different number of aircraft located at a runway that is reserved for heavy aircraft or crosswind operations than a general-purpose runway. In this manner, an accurate threshold frequency can be established for a specific airport object.

In yet other examples, the threshold comprises a range. For example, the threshold frequency at step 408 of FIG. 4 may comprise a range of frequencies, such as 10-20 aircraft/hour. In this manner, the threshold reflects a broader variety of normal behavior that can occur within the range.

In some examples, determining that the location information meets the threshold difference comprises determining that a speed condition determined from the location information meets a threshold speed condition. The speed condition may comprise any suitable type of speed value. Some examples of suitable speed values include, but are not limited to, ground speed and airspeed. In other examples, the speed condition comprises another indication of an aircraft's speed, such as a description of an aircraft's acceleration over time (e.g., 5 knots/second for 10 seconds). In this manner, the speed of the aircraft can be monitored instead of or in addition to aircraft position.

For example, at 412, the method 400 of FIG. 4 further comprises determining if an aircraft speed of one or more aircraft of the plurality of aircraft is greater than or equal to a threshold speed. In various examples, the threshold speed comprises a static threshold, a dynamic threshold, and/or a range of speed values. In some examples, a threshold speed for the runway 504 of FIG. 5 is 40-200 knots, reflecting a wide range of approach and takeoff speeds for common aircraft (e.g., single-engine piston aircraft to multi-engine turbine aircraft). In other examples, a threshold speed for the runway 504 of FIG. 5 is 80-180 knots. In yet other examples, a threshold speed for the runway 504 of FIG. 5 is 100-160 knots. It will also be appreciated that, in other examples, the threshold may comprise any other suitable value or range. In this manner, the threshold speed reflects expected aircraft behavior at the virtual representation of the physical object.

With reference again to FIG. 4, in some examples, when the speed is greater than or equal to the threshold speed, the method 400 includes outputting the indication of the anomaly at 410. In this manner, one or more aircraft traveling faster than the threshold speed can trigger the indication of the anomaly.

Altitude is another example of a parameter that can be monitored to detect an anomaly in the geospatial data. In various examples, and as introduced above with reference to FIG. 1, the location information 104 includes, for each aircraft 106 of the plurality of aircraft, an altitude 114 of the aircraft 106. The altitude 114 can be used to filter the location information 104 for the plurality of aircraft and exclude any aircraft that meets a threshold altitude 146. For example, the altitude can be used to filter the position points 510 of FIG. 5 to exclude data belonging to aircraft that are not at ground level (e.g., aircraft overflying the runway 504). In this manner, the computing device excludes location information that is not likely relevant to a given object, reducing a likelihood that such location information could produce false positive or false negative results.

In some examples, and with reference again to FIG. 4, the method 400 optionally includes outputting an indication when an anomaly is not detected, as indicated at 414. For example, the indication that the anomaly is not detected is optionally output when the frequency corresponds to an expected frequency at 408 and (when the speed condition is included at 412) when the speed is less than the threshold speed at 412. In this manner, the geospatial data can be checked or validated by determining that aircraft behavior is not anomalous. Advantageously, outputting an indication that the anomaly is not detected also enables the method 400 to be modified to prevent the occurrence of false negative results.

Figure 6:
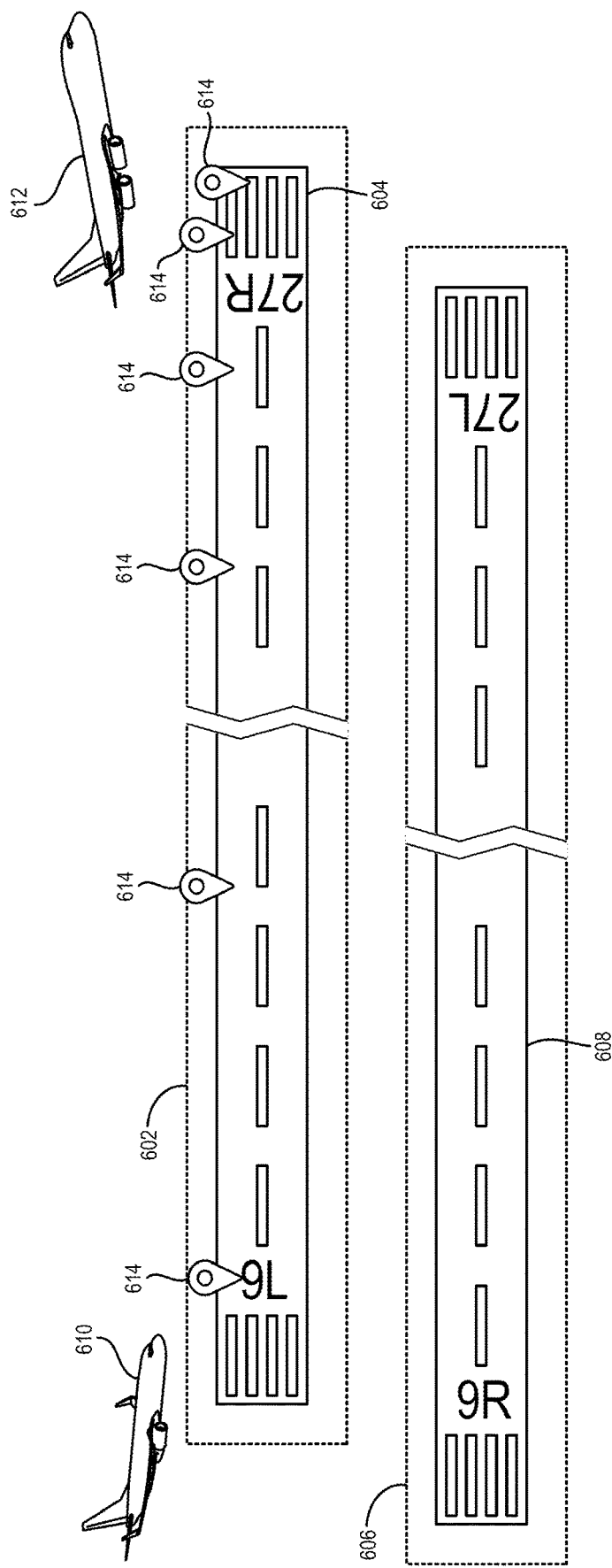
FIG. 6 shows another example use-case scenario including a virtual representation of a physical runway utilized by a plurality of aircraft.

FIG. 6 shows another example of a use-case scenario including a first virtual representation 602 corresponding to a first physical runway 604 (runway 9L-27R) and a second virtual representation 606 corresponding to a second physical runway 608 (runway 9R-27L) parallel to the first physical runway 604. Like in the example of FIG. 5, location information for a plurality of aircraft 610 and 612 comprises a plurality of position points 614. As the first runway 604 is in use, and the second runway 608 is not in use, the plurality of position points 614 are located at the first virtual representation 602 of the first runway 604.

Accordingly, an indication of an anomaly may be output based on comparing the position points 614 to the second virtual representation 606 of the second runway 608. However, an indication that the anomaly is not detected is output based on comparing the position points 614 to the first virtual representation 602. In this manner, the location information confirms that the first virtual representation 602 correctly corresponds to the first physical runway 604 and also indicates that the second virtual representation 606 does not correspond to the first physical runway 604.

With reference again to FIG. 1, in some examples, the computing device 102 is configured to store historical mapping anomaly data 162. In some examples, the historical mapping anomaly data 162 is stored at a historical database 164. The historical database 164. Like the geospatial database 140, the historical database 164 is, in various examples, maintained at the computing device 102 or at another computing device, such as a remote server. In this manner, the historical mapping anomaly data 162 is maintained for further evaluation or to serve as feedback for the anomaly detection (e.g., in a machine learning feedback loop).

Any suitable historical data can be stored. In some examples, the historical database 164 includes an aircraft registration, airline, aircraft type, ground speeds, times, coordinates, altitude, and flight tracking data. This information is used to provide feedback for the anomaly detection process, and thereby make the detection of the anomaly more accurate.

In the example of FIG. 4, the indication of the anomaly at 410 and/or the indication that the anomaly is not detected at 414 are optionally output to historical database 416. The historical database 416 can serve as the historical database 164 of FIG. 1. In some examples, the indications are output directly to the database. In other examples, the indications are output to a user (e.g., the geospatial database administrator) who inputs the indications into the database 416. In yet other examples, the user can tag the indications as being correct or incorrect, which serves as additional feedback.

In some examples, the anomaly detection (e.g., at steps 408 and 412) is implemented by one or more machine learning anomaly detection models, and the historical database 416 is used to perform feedback training on the one or more models. In other examples, a user can manually adjust an anomaly detection function based on feedback (e.g., by manually tuning neuron functions and/or weights in a neural network). In this manner, the anomaly detection can become more accurate.

As another example, the frequency and/or speed thresholds used at 408 and 412 can be adjusted using historical feedback. In some examples, this adjustment is performed on a scheduled basis (e.g., once per week or once per month). In some examples, the thresholds are adjusted until one or more of the thresholds converge at a saturation level. In this manner, the outputs of the method 400 may become more accurate and stable.

Figure 7:
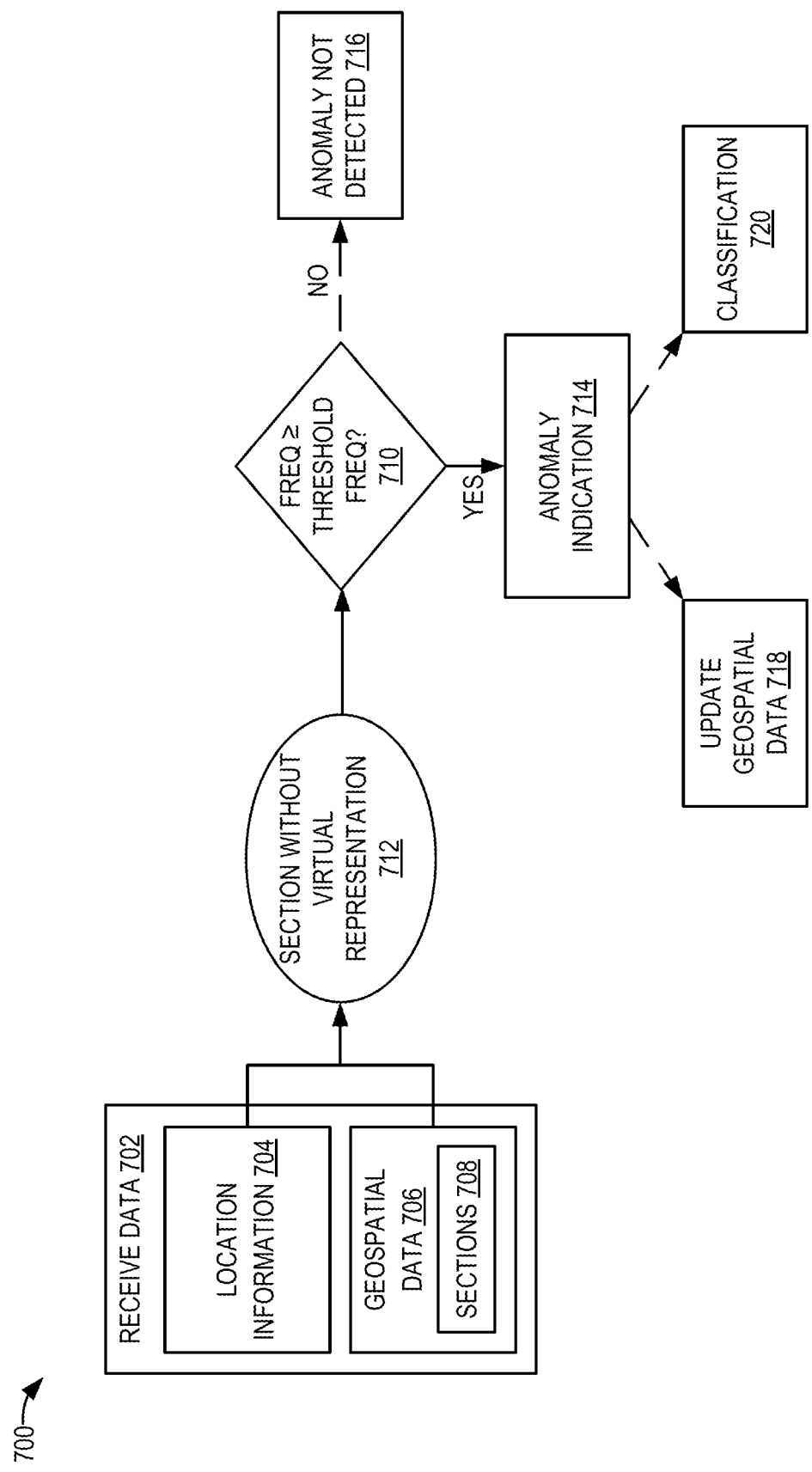
FIG. 7 shows a flowchart of another example method for detecting an anomaly in aviation object data.

With reference now to FIG. 7, another example method 700 is provided for detecting an anomaly in aviation object data. The following description of method 700 is provided with reference to the components described herein and shown in FIGS. 1-6 and 8-11. In some examples, the method 700 is performed at the computing device 102 of FIG. 1 or the computing device 220 of FIG. 2. In other examples, the method 700 is performed in other contexts using other suitable components. For example, one or more aspects of the method 700 may be performed in addition to or as an alternative to one or more aspects of the method 400 of FIG. 4.

At 702, the method 700 comprises receiving data. The data received at 702 includes location information 704 (e.g., the location information 104 of FIG. 1 or the location information 218 of FIG. 2) for a plurality of aircraft in a geographic region and geospatial data 706 (e.g., the geospatial data 136 of FIG. 1) for the geographic region. The method 700 further comprises dividing the geospatial data 706 into a plurality of sections 708.

Figure 8:
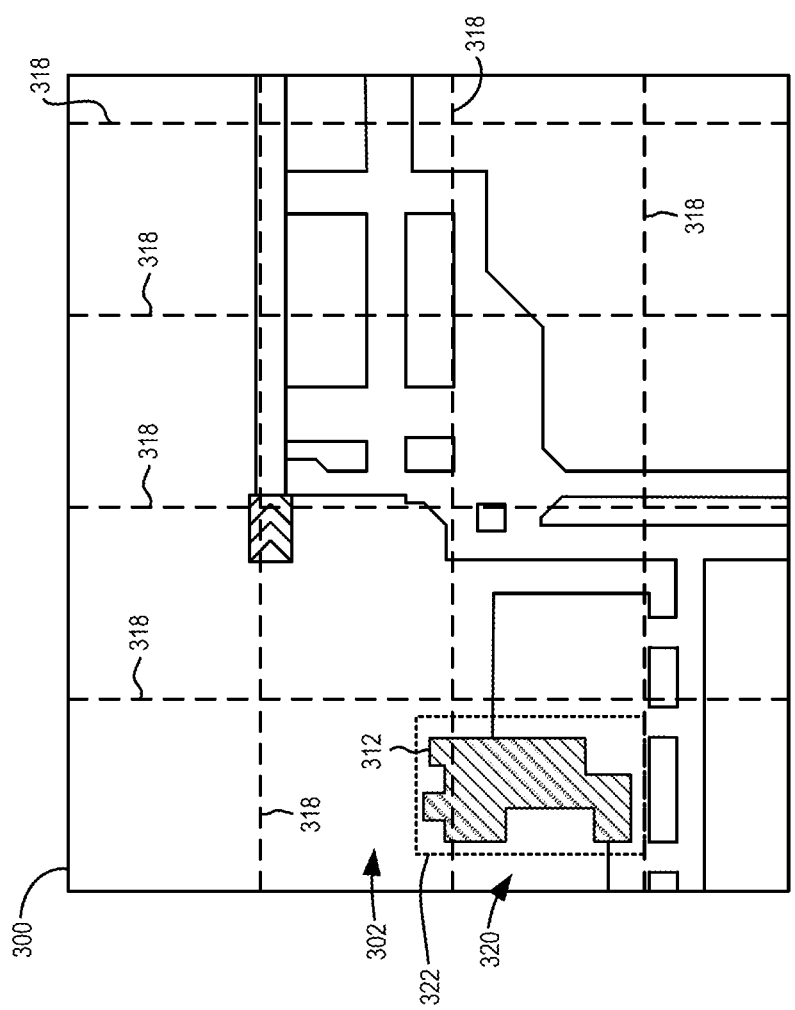
FIG. 8 shows the geospatial data of FIG. 3 divided into a plurality of sections.

As shown in FIG. 8, the map 300 is divided by gridlines 318 into a plurality of sections in the form of grid squares 320. In other examples, the geospatial data is divided in any other suitable manner into any other suitable sections. For example, an image segmentation algorithm can be used to segment the map 300 into a plurality of sections that each correspond to an object visible in the map 300. In this manner, the map 300 is broken down into discrete units for further analysis.

With reference again to FIG. 7, the method 700 comprises, at 710, determining whether a frequency at which one or more aircraft of the plurality of aircraft are located within a selected section is greater than or equal to a threshold frequency. For example, and as indicated at 712, the selected section comprises a section that does not include a virtual representation of a physical object. For example, the map 300 of FIG. 7 includes a ramp 312 that does not have a virtual representation. Based on a determination that the frequency is greater than or equal to the threshold frequency, the method 700 includes outputting the indication of the anomaly at 714. In this manner, a user or device is alerted if there is a high frequency of aircraft activity at the ramp 312 that possibly corresponds to a missing virtual representation of an airport object.

If the frequency is not greater than or equal to the threshold frequency, the method 700 optionally includes outputting an indication that the anomaly is not detected at 716. By outputting the indication that the anomaly is not detected, the method 700 enables users to evaluate the performance of an algorithm implementing the method 700, monitor validation of the geospatial data 706, and potentially prevent false negative results.

In some examples, the method 700 is further configured to, at 718, update the geospatial data 706. For example, a new virtual representation 322 is generated in FIG. 8 that corresponds to the ramp 312. In this manner, the map may be updated to include previously unmapped objects.

In various examples, the method 700 additionally or alternatively includes, at 720, classifying a physical object. For example, the map 300 of FIG. 8 may be processed by an image classification deep neural network (DNN) to tag the ramp 312 with a classification (e.g., "RAMP" or "TERMINAL"). The classification can be used to augment the geospatial data and develop a richer map of the airport.

In another example, and with reference again to the example of FIG. 5, the position points 510 can be used to determine whether the selected virtual representation is offset from the location information. In some examples, the position points 510 are further used to quantify the difference between the virtual representation 502 and the runway 504. For example, the position points 510 can be used to calculate an offset (e.g., a difference in size, position, and/or angular orientation) between the virtual representation 502 and the runway 504. The virtual representation 502 is then transformed to fit the location information. For example, the virtual representation 502 may be translated, scaled, or rotated to align with the runway 504. In this manner, the location information can be used to correct misalignment in the geospatial data.

Figure 9:
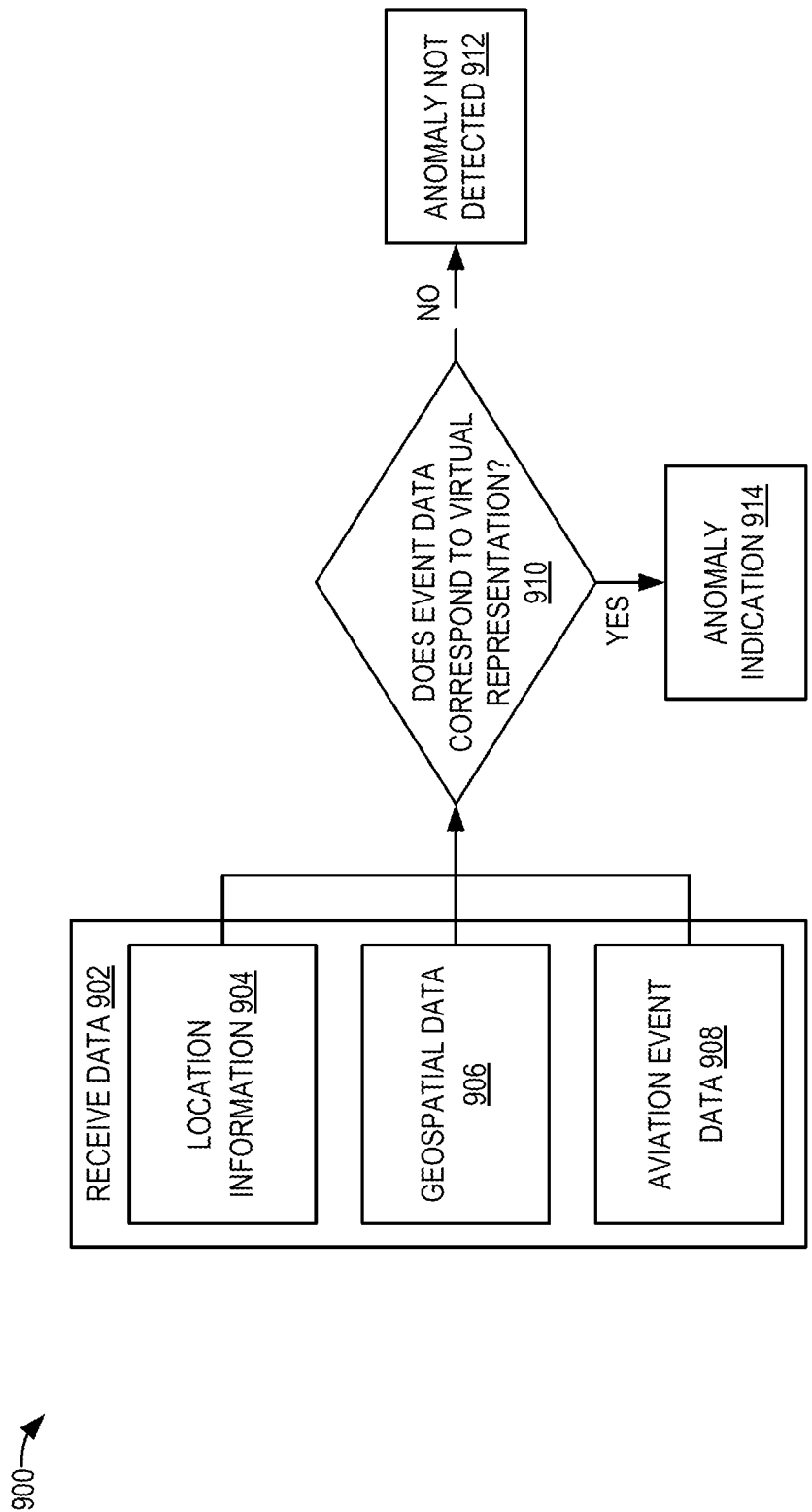
FIG. 9 shows a flowchart of yet another example method for detecting an anomaly in aviation object data.

FIG. 9 shows a flowchart of yet another example method 900 for detecting an anomaly in aviation object data. The following description of method 900 is provided with reference to the components described herein and shown in FIGS. 1-8 and 10-11. In some examples, the method 900 is performed at the computing device 102 of FIG. 1 or the computing device 220 of FIG. 2. In other examples, the method 900 is performed in other contexts using other suitable components. For example, one or more aspects of the method 900 may be performed in addition to or as an alternative to one or more aspects of the method 400 of FIG. 4 and/or one or more aspects of the method 700 of FIG. 7.

At 902, the method 900 includes receiving data 902. The data received at 902 includes location information 904 (e.g., the location information 104 of FIG. 1 or the location information 218 of FIG. 2) for a plurality of aircraft in a geographic region and geospatial data 906 (e.g., the geospatial data 136 of FIG. 1) for the geographic region. The method 900 further comprises, for a selected aircraft of the plurality of aircraft, receiving aviation event data 908 (e.g., the aviation event data 130 of FIG. 1). In some examples, the aviation event data 908 comprises system-wide information management (SWIM) flight data, aircraft communications addressing and reporting system (ACARS) data, or electronic flight log data. The aviation event data 908 is used to identify flight events that have occurred, such as the aircraft 508 of FIG. 5 taking off. The flight events are used to further validate the geospatial data 906.

The method 900 comprises determining that the selected aircraft is located at the selected virtual representation. For example, the aircraft 508 of FIG. 5 is taking off from the runway 504, which is associated with virtual representation 502. The method further comprises, at 910, determining if the aviation event data corresponds to the selected virtual representation. When the aviation event data corresponds to the selected virtual representation, the method 900 optionally includes outputting an indication that an anomaly is not detected at 912. For example, aviation event data indicating that the aircraft 508 is taking off at the virtual representation 502, and aviation event data indicating that the aircraft 506 is landing at the virtual representation 502, is not anomalous. In this manner, the aviation event data 908 validates the selected virtual representation.

In other instances, the aviation event data does not correspond to the selected virtual representation. Based at least on determining that the aviation event data does not correspond to the selected virtual representation, the method 900 comprises outputting an indication of an anomaly at 914. For example, and with reference again to FIG. 3, aviation event data indicating that an aircraft is taking off while located at a virtual representation corresponding to the parking area 308 suggests that the virtual representation of the parking area 308 or the location information is anomalous. In this manner, the aviation event data can be used to detect an anomaly.

Figure 10:
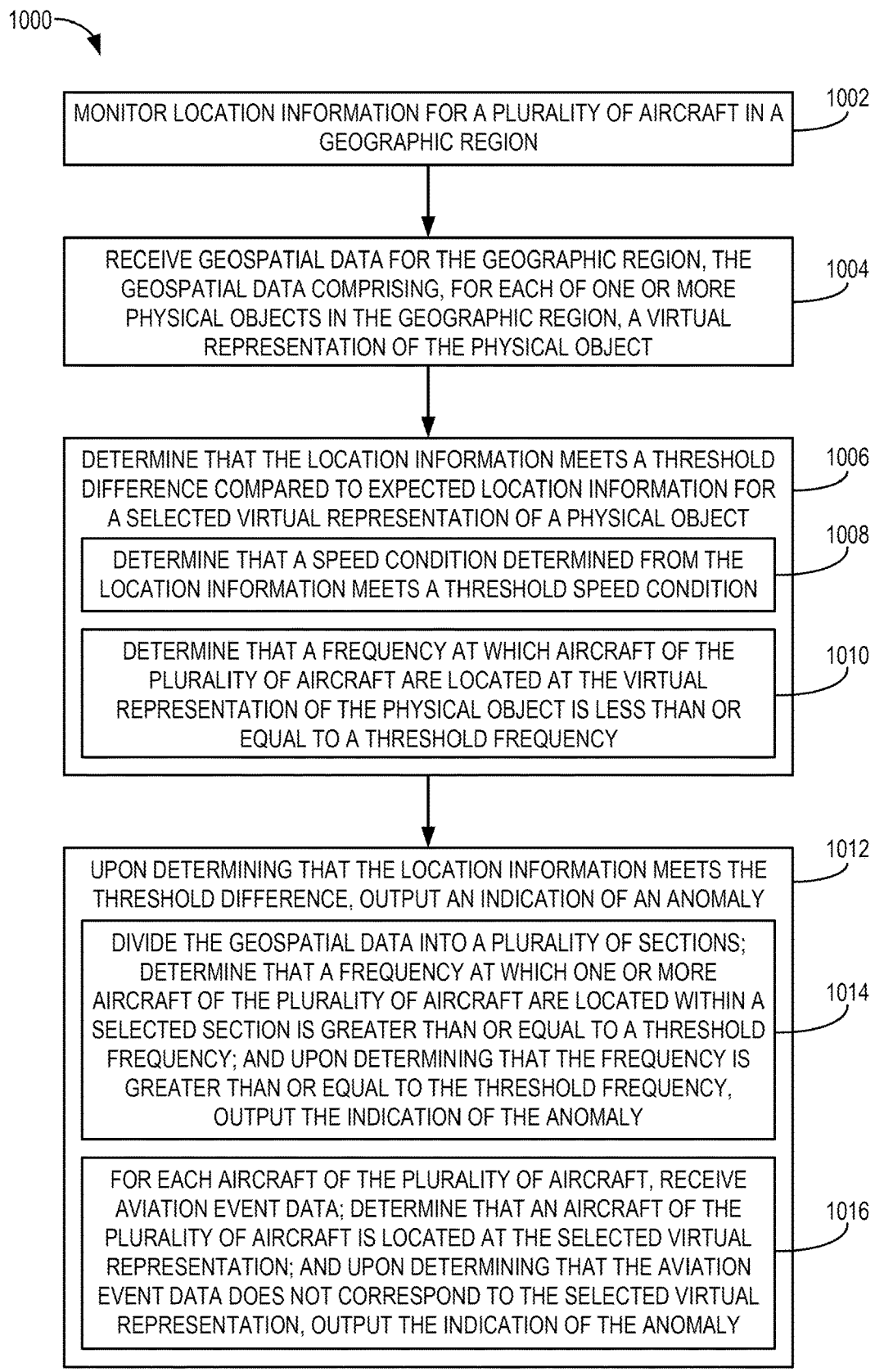
FIG. 10 shows a flowchart of a further example method for detecting an anomaly in aviation object data.

FIG. 10 shows a flowchart of yet another an example method 1000 for detecting an anomaly in aviation object data. The following description of method 1000 is provided with reference to the components described herein and shown in FIGS. 1-9 and 11. In some examples, the method 1000 is performed at the computing device 102 of FIG. 1 or the computing device 220 of FIG. 2. In other examples, the method 1000 is performed in other contexts using other suitable components.

At 1002, the method 1000 comprises monitoring location information for a plurality of aircraft in a geographic region. For example, the computing device 102 is configured to monitor location information 104 for a plurality of aircraft 106. The location information is used to identify any anomalies in geospatial data.

The method 1000 further includes, at 1004, receiving geospatial data for the geographic region. The geospatial data comprises, for each of one or more physical objects in the geographic region, a virtual representation of the physical object. For example, the computing device 102 of FIG. 1 is configured to receive geospatial data 136 comprising virtual representation 138.

At 1006, the method 1000 includes determining that the location information meets a threshold difference compared to expected location information for a selected virtual representation of a physical object. For example, the computing device 102 is configured to determine that the location information 104 meets a threshold difference 142. Comparing the location information 104 of an aircraft to the virtual representation 138 allows anomalies (e.g., misalignment of the virtual representation 138 with its corresponding physical object) to be identified in the geospatial data 136.

In some examples, at 1008, determining that the location information meets the threshold difference comprises determining that a speed condition determined from the location information meets a threshold speed condition. For example, the computing device 102 is configured to determine whether the speed 110 of the aircraft 106 meets a threshold speed 150. In this manner, one or more aircraft traveling faster than the threshold speed can trigger the indication of the anomaly.

At 1010, in some examples, determining that the location information meets the threshold difference comprises determining that a frequency at which aircraft of the plurality of aircraft are located at the virtual representation of the physical object is less than or equal to a threshold frequency. For example, the computing device 102 is configured to determine whether a frequency at which aircraft 106 are located at the virtual representation 138 is less than or equal to threshold frequency 154. In this manner, the computing device is configured to determine if the virtual representation is anomalous.

The method 1000 further includes, at 1012, upon determining that the location information meets the threshold difference, outputting an indication of an anomaly. For example, the computing device 102 is configured to output indication 156. In this manner, a user or another device is notified of the presence of a potential anomaly in the geospatial data 136.

In some examples, at 1014, the method 1000 includes dividing the geospatial data into a plurality of sections; determining that a frequency at which one or more aircraft of the plurality of aircraft are located within a selected section is greater than or equal to a threshold frequency; and upon determining that the frequency is greater than or equal to the threshold frequency, outputting the indication of the anomaly. For example, the map 300 of FIG. 8 is divided by a plurality of gridlines 318, and a determination that a frequency at which or more aircraft of the plurality of aircraft are located within a selected grid square 320 is used to identify an anomaly. In this manner, a user or device is alerted if there is a high frequency of aircraft activity at the ramp 312 that possibly corresponds to a missing virtual representation of an airport object.

At 1016, in some examples, the method 1000 comprises, for each aircraft of the plurality of aircraft, receiving aviation event data; determining that an aircraft of the plurality of aircraft is located at the selected virtual representation; and upon determining that the aviation event data does not correspond to the selected virtual representation, outputting the indication of the anomaly. For example, aviation event data indicating that an aircraft is taking off from a taxiway 306 in FIG. 3 may indicate that a virtual representation of the taxiway 306 is anomalous (e.g., a virtual representation of a runway is misclassified as a taxiway). In this manner, the aviation event data indicates the presence of an anomaly.

In some embodiments, the examples described herein can be tied to a computing system of one or more computing devices. In particular, aspects of such methods and processes can be implemented as a computer-application program or service, an application-programming interface (API), a library, and/or other computer-program product.

Figure 11:
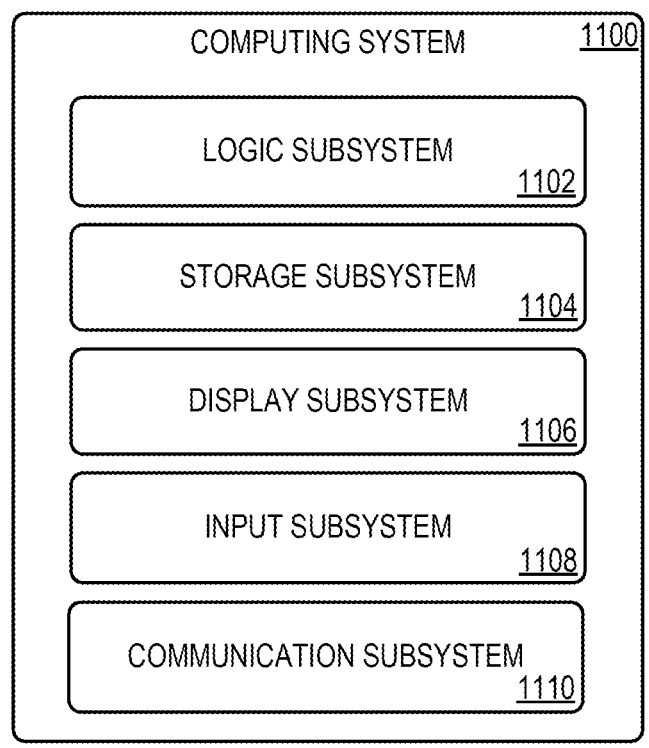
FIG. 11 shows a block diagram of an example computing system.

FIG. 11 schematically shows a non-limiting embodiment of a computing system 1100 that can enact one or more of the examples described above. For example, computing system 1100 can be used to execute instructions to perform the method 400 of FIG. 4, the method 700 of FIG. 7, the method 900 of FIG. 9, the method 1000 of FIG. 10, and/or potentially perform other functions.

Computing system 1100 is shown in simplified form. Computing system 1100 can take the form of one or more personal computers, server computers, tablet computers, network computing devices, mobile computing devices, mobile communication devices (e.g., smart phone), and/or other computing devices. In some examples, the computing device 102 of FIG. 1, the computing device 216 of FIG. 2, and/or the computing device 220 comprise one or more aspects of the computing system 1100.

Computing system 1100 includes a logic subsystem 1102, a storage subsystem 1104, and a display subsystem 1106. Computing system 1100 can optionally include an input subsystem 1108, a communication subsystem 1110, and/or other components not shown in FIG. 11.

Logic subsystem 1102 includes one or more physical devices configured to execute instructions. For example, logic subsystem 1102 can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result. For example, logic subsystem 1102 can be used to execute instructions to perform the method 400 of FIG. 4, the method 700 of FIG. 7, the method 900 of FIG. 9, and/or the method 1000 of FIG. 10.

Logic subsystem 1102 can include one or more processors configured to execute software instructions. Additionally or alternatively, logic subsystem 1102 can include one or more hardware or firmware logic machines configured to execute hardware or firmware instructions. Processors of logic subsystem 1102 can be single-core or multi-core, and the instructions executed thereon can be configured for sequential, parallel, and/or distributed processing. Individual components of logic subsystem 1102 optionally can be distributed among two or more separate devices, which can be remotely located and/or configured for coordinated processing. Aspects of logic subsystem 1102 can be virtualized and executed by remotely accessible, networked computing devices configured in a cloud-computing configuration.

Storage subsystem 1104 includes one or more physical devices configured to hold instructions executable by logic subsystem 1102 to implement the methods and processes described herein. For example, storage subsystem 1104 can hold instructions executable to perform the method 400 of FIG. 4, the method 700 of FIG. 7, the method 900 of FIG. 9, the method 1000 of FIG. 10, and/or potentially perform other functions. When such methods and processes are implemented, the state of storage subsystem 1104 can be transformed—e.g., to hold different data.

Storage subsystem 1104 can include removable and/or built-in devices. Storage subsystem 1104 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1104 can include volatile, nonvolatile, dynamic, static, read/write, read-only, random-access, sequential-access, location-addressable, file-addressable, and/or content-addressable devices.

It will be appreciated that storage subsystem 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1102 and storage subsystem 1104 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 1106 can be used to present a visual representation of data held by storage subsystem 1104. This visual representation can take the form of a graphic user interface (GUI). As the herein described methods and processes change the data held by the storage subsystem 1104, and thus transform the state of the storage machine, the state of display subsystem 1106 can likewise be transformed to visually represent changes in the underlying data. For example, display subsystem 1106 can be configured to display a graphic indication of an anomaly output by the computing device 102 and/or the map 300 of FIG. 3.

Display subsystem 1106 can include one or more display devices utilizing virtually any type of technology. Such display devices can be combined with logic subsystem 1102 and/or storage subsystem 1104 in a shared enclosure, or such display devices can be peripheral display devices.

When included, input subsystem 1108 can comprise or interface with one or more user-input devices such as a keyboard, mouse, or touch screen. In some embodiments, the input subsystem 1108 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, input subsystem 1108 can be configured to receive user inputs while performing the method 400 of FIG. 4, the method 700 of FIG. 7, the method 900 of FIG. 9, the method 1000 of FIG. 10, and/or displaying the indication 156 of FIG. 1 or the map 300 of FIG. 3.

When included, communication subsystem 1110 can be configured to communicatively couple computing system 1100 with one or more other computing devices. Communication subsystem 1110 can include wired and/or wireless communication devices compatible with one or more different communication protocols. As non-limiting examples, the communication subsystem can be configured for communication via a wireless telephone network, or a wired or wireless local- or wide-area network. In some embodiments, communication subsystem 1110 can allow computing system 1100 to send and/or receive messages (e.g., the data 124 of FIG. 1) to and/or from other devices via a network such as the Internet. For example, communication subsystem 1110 can be used receive or send data to another computing system. As another example, communication subsystem may be used to communicate with other computing systems during execution of the method 400 of FIG. 4, the method 700 of FIG. 7, the method 900 of FIG. 9, and/or the method 1000 of FIG. 10 in a distributed computing environment.

Further, the disclosure comprises configurations according to the following clauses.

Clause 1. A computing device comprising: a processor; and a memory storing instructions executable by the processor to: monitor location information for a plurality of aircraft in a geographic region; receive geospatial data for the geographic region, the geospatial data comprising, for each of one or more physical objects in the geographic region, a virtual representation of the physical object; determine that the location information meets a threshold difference compared to expected location information for a selected virtual representation of a physical object; and based at least on the determination that the location information meets the threshold difference, output an indication of an anomaly.

Clause 2. The computing device of clause 1, wherein the instructions are further executable to obtain the location information for the plurality of aircraft from one or more of ADS-B signals received from the plurality of aircraft, signals received from mobile devices, or a multilateration system.

Clause 3. The computing device of clause 1, wherein the location information includes, for each aircraft of the plurality of aircraft, an altitude of the aircraft, and wherein the instructions are further executable to filter the location information for the plurality of aircraft and exclude any aircraft that meets a threshold altitude.

Clause 4. The computing device of clause 1, wherein the location information includes, for each aircraft of the plurality of aircraft, a position, a speed, or an acceleration of the aircraft.

Clause 5. The computing device of clause 1, wherein the instructions executable to determine that the location information meets the threshold difference are executable to determine that a speed condition determined from the location information meets a threshold speed condition.

Clause 6. The computing device of clause 1, wherein the one or more physical objects include one or more of a runway, a taxiway, a parking stand, a deicing pad, a ramp, or an apron.

Clause 7. The computing device of clause 1, wherein the instructions are further executable to store historical mapping anomaly data.

Clause 8. The computing device of clause 1, wherein the instructions are further executable to determine that the location information for the plurality of aircraft does not meet a second threshold difference compared to second expected location information for a second virtual representation; and based at least on the determination that the location information for the plurality of aircraft does not meet the second threshold difference, output an indication that the anomaly is not detected.

Clause 9. The computing device of clause 1, wherein the instructions executable to determine that the location information meets the threshold difference are executable to determine that a frequency at which aircraft of the plurality of aircraft are located at the virtual representation of the physical object is less than or equal to a threshold frequency.

Clause 10. The computing device of clause 1, wherein the instructions executable to determine that the location information meets the threshold difference are executable to: divide the geospatial data into a plurality of sections; determine that a frequency at which one or more aircraft of the plurality of aircraft are located within a selected section is greater than or equal to a threshold frequency; and based on the determination that the frequency is greater than or equal to the threshold frequency, output the indication of the anomaly.

Clause 11. The computing device of clause 1, wherein the instructions are further executable to: for a selected aircraft of the plurality of aircraft, receive aviation event data; determine that the selected aircraft is located at the selected virtual representation; determine that the aviation event data does not correspond to the selected virtual representation; and based at least on the determination that the aviation event data does not correspond to the selected virtual representation, output the indication of the anomaly.

Clause 12. The computing device of clause 1, wherein the instructions are further executable to: determine that the selected virtual representation is offset from the location information; and transform the selected virtual representation to fit the location information.

Clause 13. The computing device of clause 1, wherein the expected location information comprises first expected location information for a first aircraft type and second expected location information for a second aircraft type.

Clause 14. A method for detecting an anomaly in aviation object data, the method comprising: monitoring location information for a plurality of aircraft in a geographic region; receiving geospatial data for the geographic region, the geospatial data comprising, for each of one or more physical objects in the geographic region, a virtual representation of the physical object; determining that the location information meets a threshold difference compared to expected location information for a selected virtual representation of a physical object; and upon determining that the location information meets the threshold difference, outputting an indication of an anomaly.

Clause 15. The method of clause 14, wherein determining that the location information meets the threshold difference comprises determining that a speed condition determined from the location information meets a threshold speed condition.

Clause 16. The method of clause 14, wherein determining that the location information meets the threshold difference comprises determining that a frequency at which aircraft of the plurality of aircraft are located at the virtual representation of the physical object is less than or equal to a threshold frequency.

Clause 17. The method of clause 14, wherein determining that the location information meets the threshold difference comprises: dividing the geospatial data into a plurality of sections; determining that a frequency at which one or more aircraft of the plurality of aircraft are located within a selected section is greater than or equal to a threshold frequency; and upon determining that the frequency is greater than or equal to the threshold frequency, outputting the indication of the anomaly.

Clause 18. The method of clause 14, further comprising: for each aircraft of the plurality of aircraft, receiving aviation event data; determining that an aircraft of the plurality of aircraft is located at the selected virtual representation; and upon determining that the aviation event data does not correspond to the selected virtual representation, outputting the indication of the anomaly.

Clause 19. A computing device comprising: a processor; and a memory storing instructions executable by the processor to: monitor location information for each aircraft of a plurality of aircraft in a geographic region; receive geospatial data for the geographic region, the geospatial data comprising, for each of one or more physical objects in the geographic region, a virtual representation of the physical object; determine that a frequency at which aircraft of the plurality of aircraft are located at the virtual representation of the physical object is less than or equal to a threshold frequency; and based on the determination that the frequency is less than or equal to the threshold frequency, output an indication of an anomaly.

Clause 20. The computing device of clause 19, wherein the physical object comprises one or more of a runway, a taxiway, a parking stand, a deicing pad, a ramp, or an apron.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
 a processor; and
 a memory storing instructions executable by the processor to:
  receive location data messages from a plurality of aircraft in a geographic region, wherein the location data messages comprise one or more of a transponder message or an automatic dependent surveillance-broadcast (ADS-B) message;
  use location data in the location data messages to determine a location of each aircraft of the plurality of aircraft in the geographic region;
  receive geospatial data for the geographic region, the geospatial data comprising, for a physical object in the geographic region, a virtual representation of the physical object;
  determine, based on the location of each aircraft of the plurality of aircraft in the geographic region, a frequency at which one or more aircraft of the plurality of aircraft are located within a geographic area corresponding to the virtual representation of the physical object;
  determine that the frequency at which the one or more aircraft of the plurality of aircraft are located within the geographic area corresponding to the virtual representation of the physical object is less than or equal to a threshold frequency;

based at least on the determination that the frequency at which the one or more aircraft of the plurality of aircraft are located within the geographic area corresponding to the virtual representation of the physical object is less than or equal to the threshold frequency, output an indication of an anomaly in the geospatial data;

determine, based on the location data in the location data messages, that the virtual representation is offset from the physical object by a difference in size, position, and/or angular orientation between the virtual representation and the physical object; and transform the virtual representation in the geospatial data to fit the location data in the location data messages by translating, scaling, and/or rotating the virtual representation.

2. The computing device of claim 1, wherein the instructions are further executable to obtain location information from one or more of signals received from mobile devices, or a multilateration system.

3. The computing device of claim 1, wherein the location includes, for each aircraft of the plurality of aircraft, an altitude of the aircraft, and wherein the instructions are further executable to exclude any aircraft that meets a threshold altitude.

4. The computing device of claim 1, wherein the instructions are further executable to determine, for each aircraft of the plurality of aircraft, a position, a speed, or an acceleration of the aircraft.

5. The computing device of claim 1, wherein the instructions are further executable to determine that a speed condition determined from the location data messages meets a threshold speed condition.

6. The computing device of claim 5, wherein the threshold speed condition comprises a first threshold speed for a first aircraft type and a second threshold speed for a second aircraft type.

7. The computing device of claim 1, wherein the physical object includes a runway, a taxiway, a parking stand, a deicing pad, a ramp, or an apron.

8. The computing device of claim 1, wherein the instructions are further executable to store historical mapping anomaly data.

9. The computing device of claim 1, wherein the instructions are further executable to:
determine that location information for the plurality of aircraft does not meet a second threshold difference compared to a second virtual representation; and
based at least on the determination that the location information for the plurality of aircraft does not meet the second threshold difference, output an indication that the anomaly is not detected.

10. The computing device of claim 1, wherein the instructions are further executable to:
divide the geospatial data into a plurality of sections;
determine that a frequency at which one or more aircraft of the plurality of aircraft are located within a selected section is greater than or equal to a threshold frequency; and
based on the determination that the frequency is greater than or equal to the threshold frequency, output the indication of the anomaly.

11. The computing device of claim 1, wherein the instructions are further executable to:
for a selected aircraft of the plurality of aircraft, receive aviation event data;
determine that the selected aircraft is located at the virtual representation;
determine that the aviation event data does not correspond to the virtual representation; and
based at least on the determination that the aviation event data does not correspond to the virtual representation, output the indication of the anomaly.

12. The computing device of claim 1, wherein the geospatial data comprises a map of an airport.

13. A method for detecting an anomaly in aviation object data, the method comprising:
receiving location data messages from a plurality of aircraft in a geographic region, wherein the location data messages comprise one or more of a transponder message or an automatic dependent surveillance-broadcast (ADS-B) message;
using location data in the location data messages to determine a location of each aircraft of the plurality of aircraft in the geographic region;
receiving geospatial data for the geographic region, the geospatial data comprising, for a physical object in the geographic region, a virtual representation of the physical object;
determining, based on the location of each aircraft of the plurality of aircraft in the geographic region, a frequency at which one or more aircraft of the plurality of aircraft are located within a geographic area corresponding to the virtual representation of the physical object;
determining that the frequency at which the one or more aircraft of the plurality of aircraft are located within the geographic area corresponding to the virtual representation of the physical object is less than or equal to a threshold frequency;
upon determining that the frequency at which the one or more aircraft of the plurality of aircraft are located within the geographic area corresponding to the virtual representation of the physical object is less than or equal to the threshold frequency, outputting an indication of an anomaly in the geospatial data;
determining, based on the location data in the location data messages, that the virtual representation is offset from the physical object by a difference in size, position, and/or angular orientation between the virtual representation and the physical object; and
transforming the virtual representation in the geospatial data to fit the location data in the location data messages by translating, scaling, and/or rotating the virtual representation.

14. The method of claim 13, further comprising determining that a speed condition determined from the location data messages meets a threshold speed condition.

15. The method of claim 13, wherein receiving the geospatial data comprises receiving a map of an airport.

16. The method of claim 13, further comprising:
dividing the geospatial data into a plurality of sections;
determining that a frequency at which one or more aircraft of the plurality of aircraft are located within a selected section is greater than or equal to a threshold frequency; and
upon determining that the frequency is greater than or equal to the threshold frequency, outputting the indication of the anomaly.

17. The method of claim 13, further comprising:
for each aircraft of the plurality of aircraft, receiving aviation event data;
determining that an aircraft of the plurality of aircraft is located at the virtual representation; and
upon determining that the aviation event data does not correspond to the virtual representation, outputting the indication of the anomaly.

18. A computing device comprising:
a processor; and
a memory storing instructions executable by the processor to:
receive location data messages from a plurality of aircraft in a geographic region, wherein the location data messages comprise one or more of a transponder message or an automatic dependent surveillance-broadcast (ADS-B) message;
use location data in the location data messages to determine a location of each aircraft of the plurality of aircraft in the geographic region;
receive geospatial data for the geographic region, the geospatial data comprising, for a physical object in the geographic region, a virtual representation of the physical object;
determine that a frequency at which aircraft of the plurality of aircraft are located within a geographic area corresponding to the virtual representation of the physical object is less than or equal to a threshold frequency;
based on the determination that the frequency is less than or equal to the threshold frequency, output an indication of an anomaly in the geospatial data;
determine, based on the location data in the location data messages, that the virtual representation is offset from the physical object by a difference in size, position, and/or angular orientation between the virtual representation and the physical object; and
transform the virtual representation in the geospatial data to fit the location data in the location data messages by one or more of: translating, scaling, and/or rotating the virtual representation.

19. The computing device of claim 18, wherein the physical object comprises one or more of a runway, a taxiway, a parking stand, a deicing pad, a ramp, or an apron.

20. The computing device of claim 18, wherein the geospatial data comprises a map of an airport.

\* \* \* \* \*